(12) United States Patent
Singh Bawa et al.

(10) Patent No.: US 10,978,054 B1
(45) Date of Patent: Apr. 13, 2021

(54) UTILIZING MACHINE LEARNING MODELS FOR DETERMINING AN OPTIMIZED RESOLUTION PATH FOR AN INTERACTION

(71) Applicant: Accenture Global Solutions Limited, Dublin (IE)

(72) Inventors: Gurpreet Singh Bawa, Gurgaon (IN); Kaustav Pakira, Mumbai (IN); Souvik Chakraborty, Kolkata (IN); Sanjay S. Sharma, New Delhi (IN); Kaushik Sanyal, Abu Dhabi (AE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/088,218

(22) Filed: Nov. 3, 2020

(51) Int. Cl.
| | |
|---|---|
| *G06N 5/04* | (2006.01) |
| *G10L 15/18* | (2013.01) |
| *G06N 20/00* | (2019.01) |
| *H04L 12/58* | (2006.01) |
| *G10L 15/22* | (2006.01) |
| *G10L 15/30* | (2013.01) |
| *G06F 16/43* | (2019.01) |

(52) U.S. Cl.
CPC .......... *G10L 15/1815* (2013.01); *G06F 16/43* (2019.01); *G06N 20/00* (2019.01); *G10L 15/22* (2013.01); *G10L 15/30* (2013.01); *H04L 51/02* (2013.01)

(58) Field of Classification Search
CPC ..... G10L 15/1815; G10L 15/22; G10L 15/30; G06F 16/43; H04L 51/02; G06N 20/00; G06N 5/00–048; G06N 7/00–08
See application file for complete search history.

(56) References Cited

U.S. PATENT DOCUMENTS

| | | | |
|---|---|---|---|
| 2009/0271232 A1* | 10/2009 | Waguet | G06Q 10/06 705/7.36 |
| 2020/0089561 A1* | 3/2020 | Laing | G06F 11/0727 |
| 2020/0218993 A1* | 7/2020 | Kumar | G06N 5/025 |

* cited by examiner

*Primary Examiner* — Abul K Azad
(74) *Attorney, Agent, or Firm* — Harrity & Harrity, LLP

(57) ABSTRACT

In some implementations, a device may receive unstructured interaction data identifying an interaction of a user with a user device. The device may receive historical unstructured interaction data identifying historical interactions of users and historical unstructured resolution data identifying historical resolutions to the historical interactions. The device may process the historical unstructured interaction data and the historical unstructured resolution data to determine historical structured interaction data and historical structured resolution data. The device may process the unstructured interaction data and the historical structured interaction data to determine pretext identifiers for the interaction of the user. The device may process the pretext identifiers and the historical structured resolution data to generate a resolution network identifying possible resolutions to the interaction of the user. The device may process the pretext identifiers and the resolution network to determine a resolution path identifying a resolution to the interaction of the user.

20 Claims, 10 Drawing Sheets

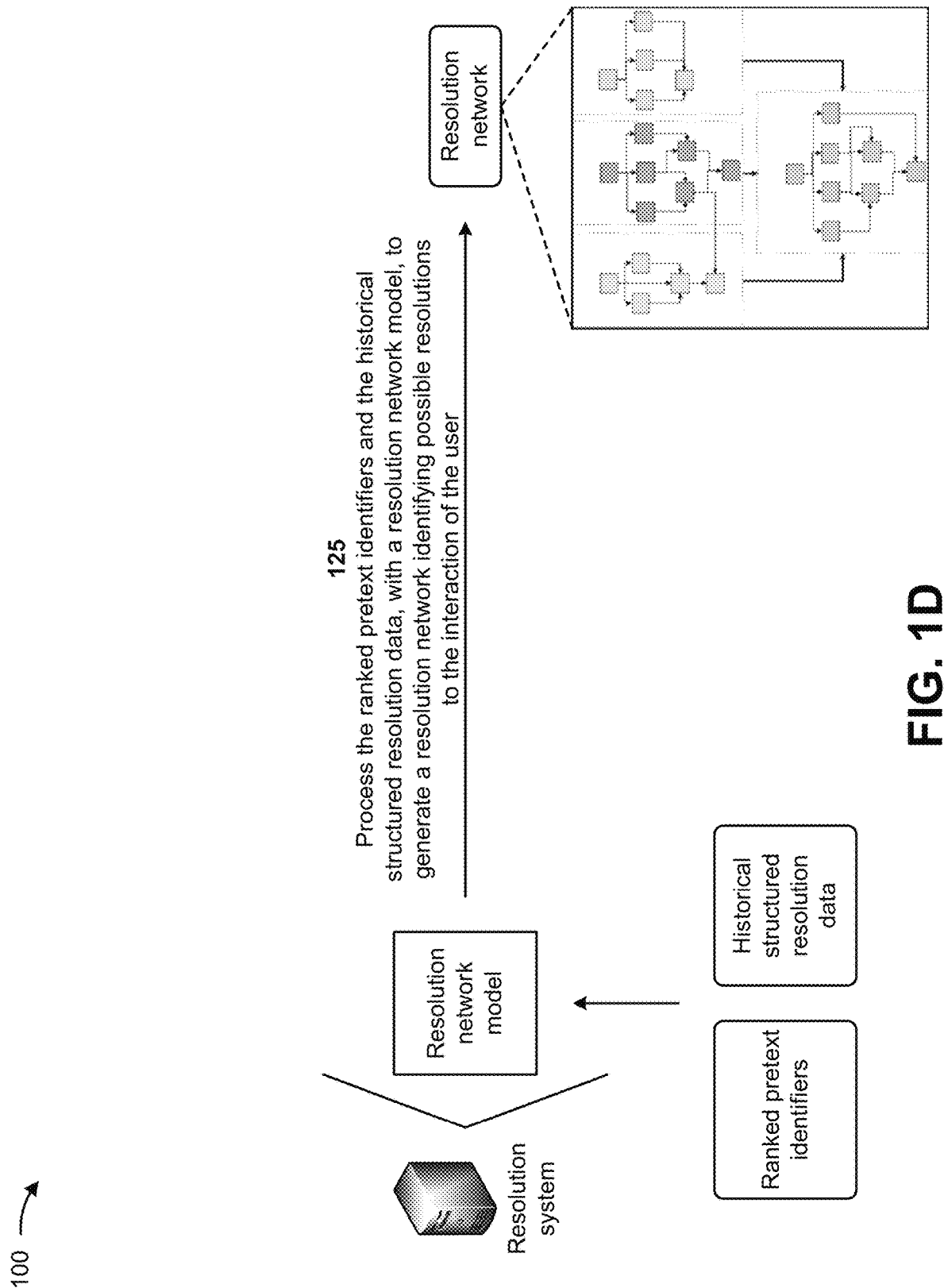

UTILIZING MACHINE LEARNING MODELS FOR DETERMINING AN OPTIMIZED RESOLUTION PATH FOR AN INTERACTION

BACKGROUND

Conversational artificial intelligence (AI) is a set of technologies behind automated messaging and speech-enabled applications that offer human-like interactions between computers and humans. In most conversational AI platforms, automated chatbots can interact with users and effectively reduce call volumes and/or human-assisted involvement.

SUMMARY

In some implementations, a method includes receiving, by a device, unstructured interaction data identifying an interaction of a user with a user device; receiving, by the device, historical unstructured interaction data identifying historical interactions of users and historical unstructured resolution data identifying historical resolutions to the historical interactions; processing, by the device, the historical unstructured interaction data and the historical unstructured resolution data, with a prior interactions model, to determine historical structured interaction data and historical structured resolution data, respectively; processing, by the device, the unstructured interaction data and the historical structured interaction data, with a pretext identifier model, to determine ranked pretext identifiers for the interaction of the user; processing, by the device, the ranked pretext identifiers and the historical structured resolution data, with a resolution network model, to generate a resolution network identifying possible resolutions to the interaction of the user; processing, by the device, the ranked pretext identifiers and the resolution network, with a resolution path optimizer model, to determine a resolution path identifying a resolution to the interaction of the user; and causing, by the device, the resolution to be implemented.

In some implementations, a device includes one or more memories and one or more processors, communicatively coupled to the one or more memories, configured to: receive unstructured interaction data identifying an interaction of a user with a user device; receive historical unstructured interaction data identifying historical interactions of users and historical unstructured resolution data identifying historical resolutions to the historical interactions; process the historical unstructured interaction data and the historical unstructured resolution data, with a prior interactions model, to determine historical structured interaction data and historical structured resolution data, respectively; process the unstructured interaction data and the historical structured interaction data, with a pretext identifier model, to determine ranked pretext identifiers for the interaction of the user; process the ranked pretext identifiers and the historical structured resolution data, with a resolution network model, to determine a resolution network identifying possible resolutions to the interaction of the user; process the ranked pretext identifiers and the resolution network, with a resolution path optimizer model, to determine a resolution path identifying a resolution to the interaction of the user; and perform one or more actions based on the resolution path.

In some implementations, a non-transitory computer-readable medium storing a set of instructions includes one or more instructions that, when executed by one or more processors of a device, cause the device to: receive interaction data identifying an interaction of a user with a user device; receive historical interaction data identifying historical interactions of users and historical resolution data identifying historical resolutions to the historical interactions; process the interaction data and the historical interaction data, with a pretext identifier model, to determine ranked pretext identifiers for the interaction of the user; process the ranked pretext identifiers and the historical resolution data, with a resolution network model, to generate a resolution network identifying possible resolutions to the interaction of the user; process the ranked pretext identifiers and the resolution network, with a resolution path optimizer model, to determine a resolution path identifying a resolution to the interaction of the user; and cause the resolution to be implemented.

BRIEF DESCRIPTION OF THE DRAWINGS

FIGS. 1A-1F are diagrams of an example implementation described herein.

DETAILED DESCRIPTION

Figure 1A:
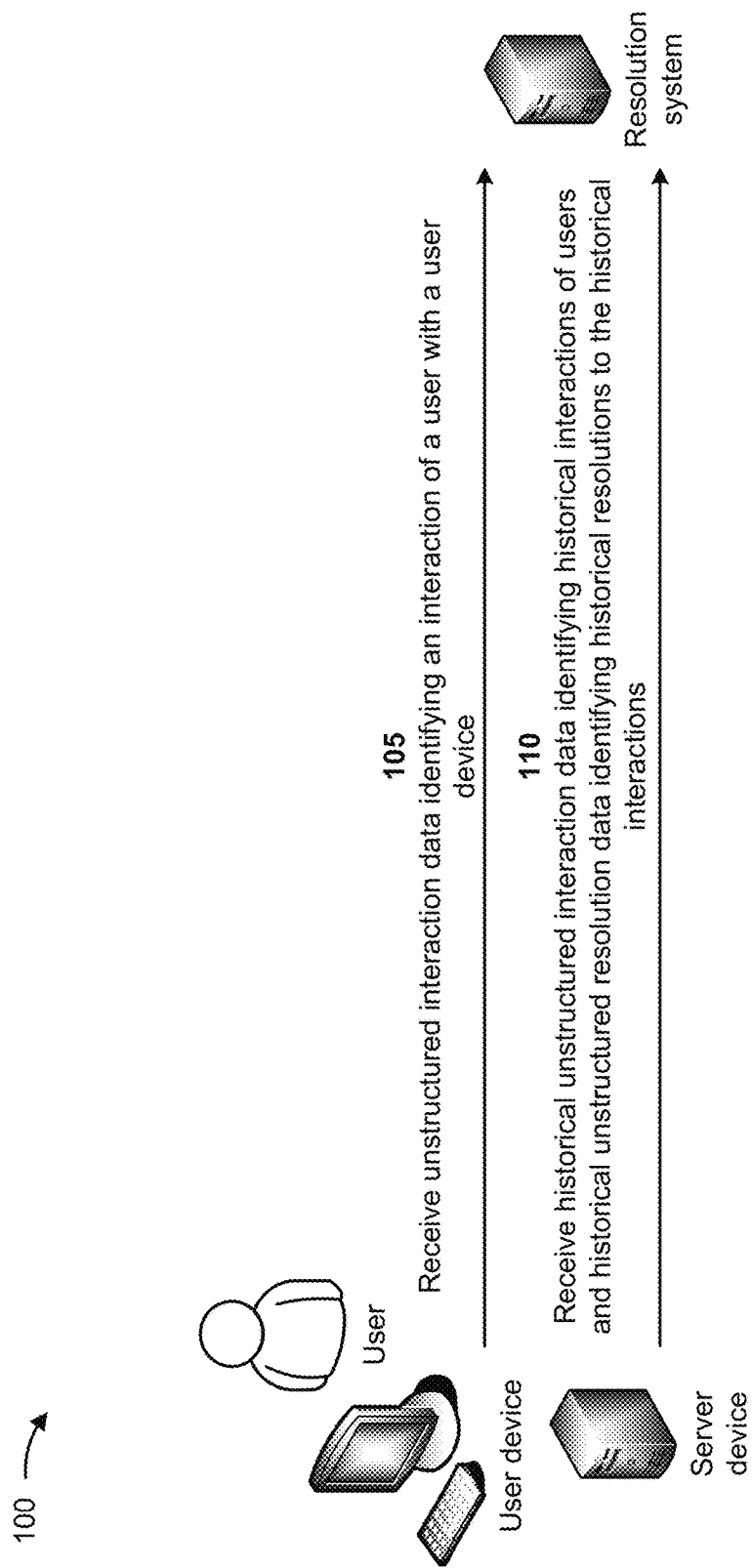

The following detailed description of example implementations refers to the accompanying drawings. The same reference numbers in different drawings may identify the same or similar elements.

In most conversational AI platforms, automated chatbots can interact with users and effectively reduce call volumes and/or human-assisted involvement. However, if a resolution to an interaction includes multiple sequential stages, the conversational AI platforms lack flexibility and a conversation may end up being provided to a human agent. Planning for multiple sequential stages may require pre-conceptualization of an exhaustive set of situations, which may be difficult to implement. Conversation design in conversational AI platforms considers each situation as a potential conversation flow and designs a resolution flow accordingly. The conversation flows that are designed are limited to only use-cases which are simplistic or do not involve multiple stages. For conversation flows involving multiple stages, separate conversation flows may need to be designed for each specific situation corresponding to the multiple stages. In more complicated situations, a conversation ends up being transferred to a human agent who assists the user to solve issues. This, in turn, wastes computing resources (e.g., processing resources, memory resources, communication resources, and/or the like), networking resources, and/or the like associated with processing a conversation flow that ultimately is provided to a human agent, providing the conversation flow to the human agent, attempting to design unlimited conversation flows, and/or the like.

Some implementations described herein relate to a resolution system that utilizes machine learning models for determining an optimized resolution path for an interaction (e.g., a conversation with multiple sequential stages). For example, the resolution system may receive unstructured interaction data identifying an interaction of a user with a conversational AI platform. The resolution system may receive historical unstructured interaction data identifying historical interactions of users and historical unstructured resolution data identifying historical resolutions to the historical interactions. The resolution system may process the historical unstructured interaction data and the historical unstructured resolution data, with a prior interactions model, to determine historical structured interaction data and historical structured resolution data, respectively. The resolution system may process the unstructured interaction data and the historical structured interaction data, with a pretext identifier model, to determine ranked pretext identifiers for the interaction of the user. The resolution system may process the ranked pretext identifiers and the historical structured resolution data, with a resolution network model, to generate a resolution network identifying possible resolutions to the interaction of the user. The resolution system may process the ranked pretext identifiers and the resolution network, with a resolution path optimizer model, to determine a resolution path identifying a resolution to the interaction of the user. The resolution system may cause the resolution to be implemented.

In this way, the resolution system utilizes machine learning models for determining an optimized resolution path for an interaction. The resolution system may utilize user-human agent unstructured interaction data to establish a motive behind an interaction and an underlying consequential pretext that caused the interaction. The resolution system may create a multi-nodal network representing different stages that resolved issues of the prior interactions, and may determine an optimized path to resolution from the multi-nodal network for issues raised through future interactions. This, in turn, conserves computing resources, networking resources, and/or the like that would otherwise have been wasted in processing a conversation flow that eventually is provided to a human agent, providing the conversation flow to the human agent, attempting to design unlimited conversation flows, and/or the like.

FIGS. 1A-1F are diagrams of an example 100 associated with utilizing machine learning models for determining an optimized resolution path for an interaction. As shown in FIGS. 1A-1F, example 100 includes a user device and a server device associated with a user and a resolution system. The user device may include a laptop computer, a mobile telephone, a desktop computer, and/or the like utilized by the user. The user device may include a conversational AI system that includes an automated chatbot. The server device may include a device that collects and/or determines historical unstructured interaction data identifying historical interactions of users and/or historical unstructured resolution data identifying historical resolutions to the historical interactions. The resolution system may include a system that utilizes machine learning models to determine an optimized resolution path for an interaction, as described herein.

As shown in FIG. 1A, and by reference number 105, the resolution system receives unstructured interaction data identifying an interaction of a user with a user device. For example, the resolution system may receive unstructured interaction data identifying an interaction of the user with an automated chatbot via the user device. In some implementations, the unstructured interaction data includes text input by the user and/or output by the automated chatbot. For example, the user may input text via a user interface associated with the automated chatbot. The automated chatbot may provide a textual response to the input text via the user interface. The user device may provide unstructured interaction data including the text input by the user and the text response provided by the automated chatbot to the resolution system.

Alternatively, and/or additionally, the unstructured interaction data includes audio data. For example, the user may verbally communicate with the automated chatbot via the user device. The automated chatbot may be a speech-enabled automated chatbot and may provide a verbal response to the verbal communication of the user. The user device may record the verbal communication between the user and the speech-enabled automated chatbot to generate audio data. The user device may provide unstructured interaction data including the audio data to the resolution system.

The resolution system may receive the unstructured interaction data from the user device. The resolution system may identify audio data included in the unstructured interaction data and may convert the audio data into text. The resolution system may store the unstructured interaction data in a data structure (e.g., a database, a table, a list, and/or the like).

As shown by reference number 110, the resolution system receives historical unstructured interaction data identifying historical interactions of users and historical unstructured resolution data identifying historical resolutions to the historical interactions from the server device. The resolution system may receive the historical periodically (e.g., daily, weekly, monthly, and/or the like), in response to a request transmitted by resolution system to the server device, based on receiving the unstructured interaction data, and/or the like.

In some implementations, the historical unstructured interaction data and the historical unstructured resolution data is included in historical conversation data associated with a plurality of conversations between users and automated chatbots and/or between users and human agents. For example, upon conclusion of a conversation between a user and an automated chatbot and/or a user and a human agent, the user device may store text and/or audio data associated with the conversation as conversation data. The user device may store the conversation data in a data structure stored in a memory of the server device.

In some implementations, the conversation data includes conversation information. The conversation information may include an identifier associated with the conversation, information identifying the user, an age of the user, a gender of the user, a quantity of conversations associated with the user, information identifying the user device, information identifying a time and/or a date on which the conversation occurred, and/or the like.

For each conversation, of the plurality of conversations, the resolution system may identify a portion of the conversation corresponding to historical unstructured interaction data and may identify a portion of the conversation corresponding to historical unstructured resolution data. In some implementations, the resolution system may identify the portion of the conversation corresponding to the historical unstructured interaction data based on the portion of the conversation being communicated by the user to the automated chatbot and/or the human agent. The resolution system may identify the portion of the conversation corresponding to the historical unstructured resolution data based on the portion of the conversation being communicated by the automated chatbot and/or the human agent to the user.

Alternatively, and/or additionally, the resolution system may perform one or more natural language processing (NLP) techniques to determine the portion of the conversation corresponding to the historical unstructured interaction data and the portion of the conversation corresponding to historical unstructured resolution data. For example, the resolution system may analyze the historical conversation data using a token-based NLP technique (e.g., a technique using regular expressions), a category-based NLP technique (e.g., a named entity recognition (NER) technique), an approximation-based NLP technique (e.g., a fuzzy text search technique), and/or the like.

In some implementations, the historical unstructured interaction data and/or the historical unstructured resolution data is associated with a historical interaction between the user and a human agent. As an example, the user may interact (e.g., via text and/or verbally) with the automated chatbot to resolve a particular issue. The automated chatbot may be unsuccessful in resolving the particular issue and may transfer the user to a human agent. The user may interact (e.g., via text and/or verbally) with the human agent to resolve the issue. The historical unstructured interaction data may include data (e.g., text and/or audio data) associated with the interaction between the user and the automated chatbot and/or the interaction between the user and the human agent. The historical unstructured resolution data may include data (e.g., text and/or audio data) associated with the interaction between the user and the human agent based on the automated chatbot being unsuccessful in resolving the particular issue.

Figure 1B:
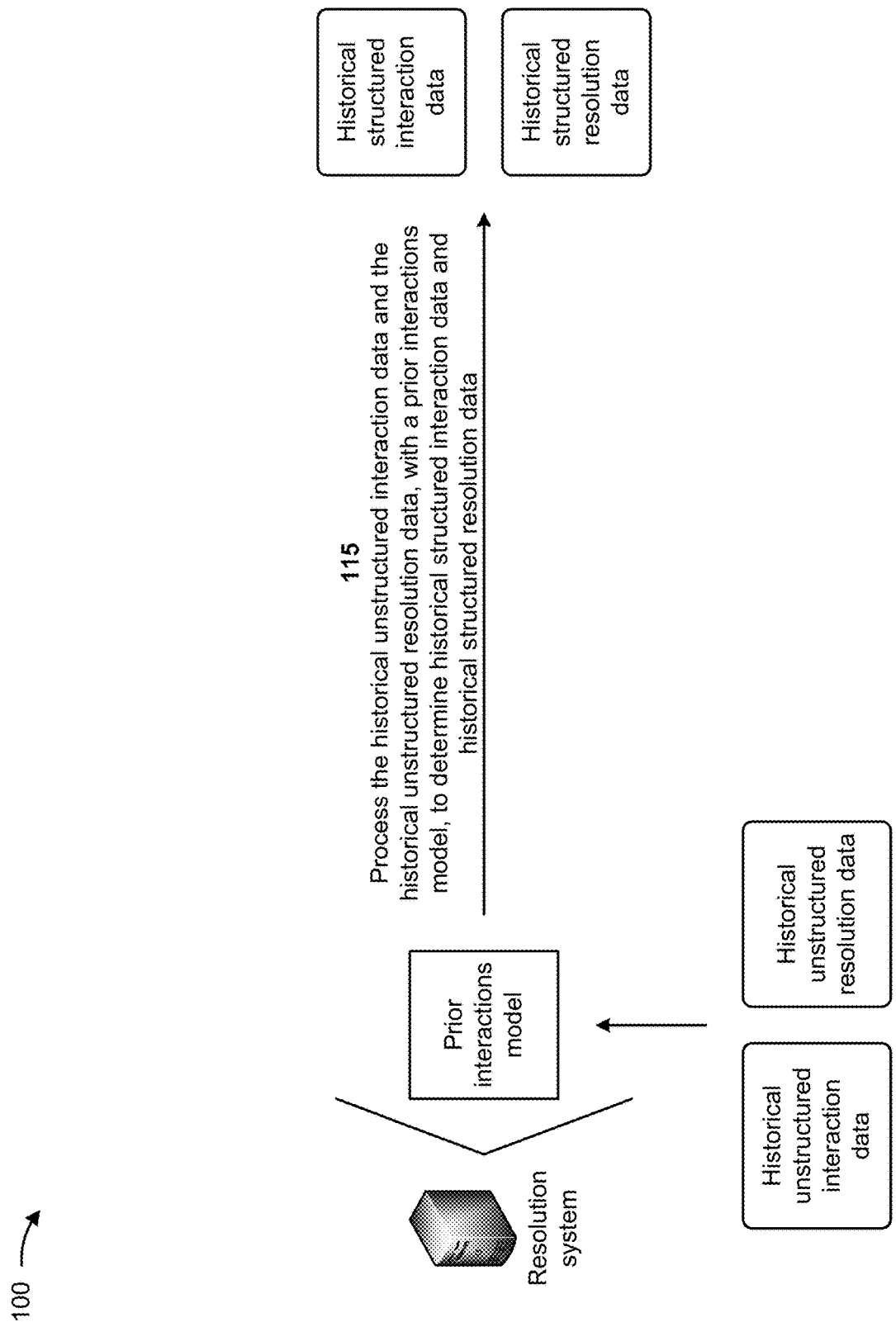

As shown in FIG. 1B, and by reference number 115, the resolution system processes the historical unstructured interaction data and the historical unstructured resolution data, with a prior interactions model, to determine historical structured interaction data and historical structured resolution data. The resolution system may convert audio data of the historical unstructured interaction data and the historical unstructured resolution data into text data. The resolution system may combine the text data generated based on converting the audio data of the historical unstructured interaction data with text data of the historical unstructured interaction data to generate combined historical unstructured interaction data. The resolution system may combine text data generated based on converting the audio data of the historical unstructured resolution data with text data of the historical unstructured resolution data to generate combined historical unstructured resolution data.

In some implementations, the resolution system may convert the historical unstructured interaction data and/or the historical unstructured resolution data into a common format based on the conversion rule. For example, the resolution system may convert the historical unstructured interaction data and/or the historical unstructured resolution data into a format compatible with a pretext identifier model and/or a resolution network model, described in greater detail below.

In some implementations, the resolution system determines one or more metrics associated with the unstructured interaction data and/or the unstructured resolution data. For example, the resolution system may determine a term frequency-inverse document frequency (TF-IDF) metric that reflects an importance of a word included in the unstructured interaction data and/or the resolution system, a sentiment score metric that indicates whether the unstructured interaction data and/or the unstructured resolution data reflect a positive, negative, or neutral sentiment, and/or the like.

Figure 1C:
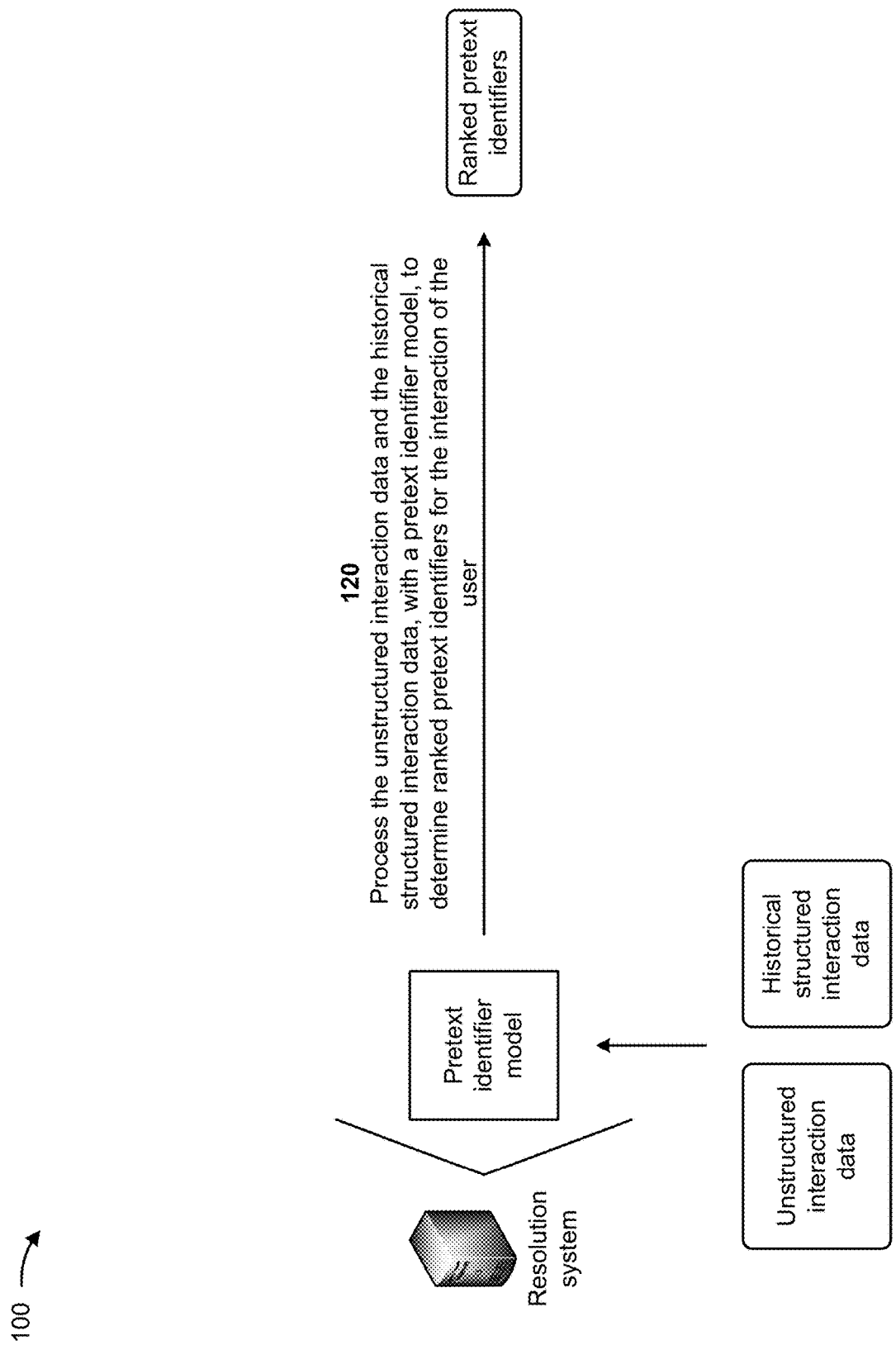

As shown in FIG. 1C, and by reference number 120, the resolution system processes the unstructured interaction data and the historical structured interaction data, with a pretext identifier model, to determine ranked pretext identifiers for the interaction of the user. The pretext identifier model may include a random forest model, a linear regression model, a neural network model, and/or a classification model. A pretext identifier may comprise information identifying a pretext (e.g., a primary reason, a primary purpose, and/or the like) associated with a conversation associated with the historical structured interaction data.

In some implementations, the resolution system may perform one or more NLP techniques to analyze the historical unstructured interaction data and/or the historical unstructured resolution data to determine pretexts associated with the historical unstructured interaction data and/or the historical resolution system, such as steps for obtaining a particular type of loan, an inquiry regarding an account balance, an inquiry regarding a status of a network, steps for accessing an application, and/or the like.

The resolution system may group the historical structured interaction data into a plurality of groups of the historical structured interaction data based on the pretexts. The resolution system may identify latent groups in the historical structured interaction data based on a pretext associated with the historical structured interaction data. For example, the resolution system may determine a pretext associated with a conversation and may group the historical structured interaction data into clusters based on the data being associated with similar pretexts. In some implementations, the resolution system may segregate words into different context windows to form a term frequency matrix. The term frequency matrix may be used as an input for orthogonal matrix factorization to generate a non-singular matrix indicating the latent group of the historical structured interaction data for each of the plurality of conversations associated with the historical structured interaction data.

The resolution system may compare the unstructured interaction data with the plurality of groups of the historical structured interaction data to determine a plurality of similarity scores. The resolution system may determine the ranked pretext identifiers based on the plurality of similarity scores. For example, the resolution system may determine that a pretext identifier associated with a highest similarity score relative to similar scores associated with other pretext identifiers is a highest ranking pretext identifier.

As shown in FIG. 1D, and by reference number 125, the resolution system processes the ranked pretext identifiers and the historical structured resolution data, with a resolution network model, to generate a resolution network model identifying possible resolutions to the interaction of the user. The resolution network model may include a network generator and/or a programmatic information interlinking graph model.

The resolution system may process the historical structured interaction data and the historical structured resolution data to extract subjects and objects discussed during the plurality of conversations from the historical structured interaction data and the historical structured resolution data. The resolution system may generate nodes of the resolution network based on the subjects and the objects. For example, each node may correspond to a respective subject and/or object discussed during the plurality of conversations. The resolution system may perform a dependency parsing on the historical unstructured interaction data and/or the historical unstructured resolution data. The resolution system may determine entities corresponding to the subjects and the objects based on performing the dependency parsing. The resolution system may identify verbs included in the historical unstructured interaction data and/or the historical unstructured resolution data. The resolution system may determine a relationship between entities based on the verbs occurring between the entities in the historical unstructured interaction data and/or the historical unstructured resolution data. The resolution system may determine an action between the subjects and the objects based on the verbs between the subject and the objects. The resolution system may provide connectors between the nodes of the resolution network based on the actions between the subjects and the objects.

Figure 1E:
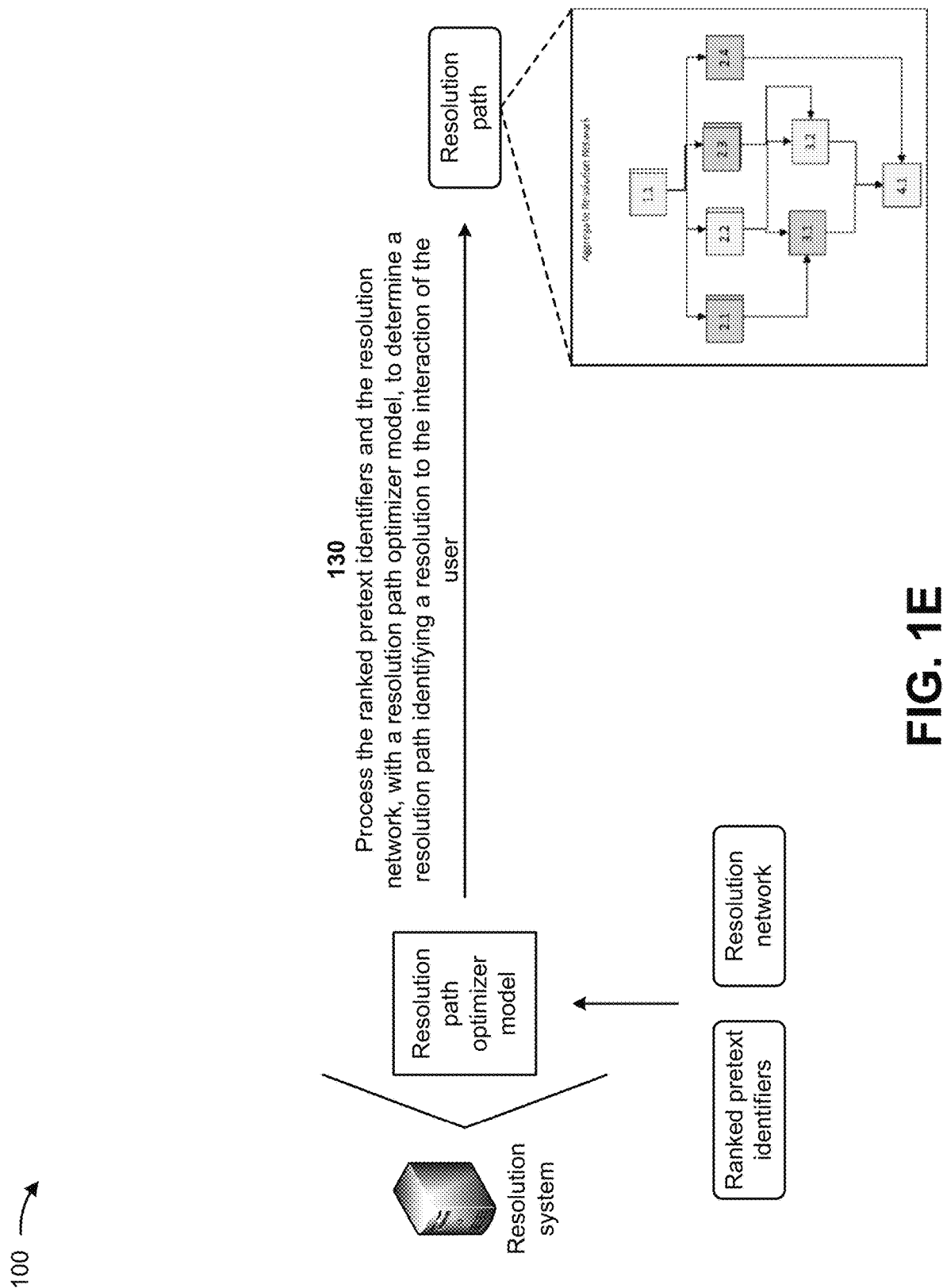

As shown in FIG. 1E, and by reference number 130, the resolution system processes the ranked pretext identifiers and the resolution network, with a resolution path optimizer model, to determine a resolution path identifying a resolution to the interaction of the user. The resolution path optimizer model may include an iterative probabilistic model, a posterior probability approach, and/or a stepwise node selection process.

The resolution system may identify a plurality of resolution paths through the resolution network. For example, the resolution system may identify a plurality of paths through the resolution network to reach a node corresponding to a resolution associated with the unstructured interaction data. In some implementations, the resolution system may identify each possible path through the resolution network. In some implementations, the resolution system may identify a predetermined quantity of paths through the resolution network.

The resolution system may determine a conditional probability associated with each node included in the resolution network. The resolution system may determine the conditional probability for a node based on information associated with the user associated with the unstructured interaction data (e.g., an age of the user, a quantity of times the user has conversed with the automated chatbot and/or a human agent, and/or the like), the one or more metrics determined for the historical unstructured interaction data and/or the historical unstructured resolution data, a previous node included in the resolution path, and/or the like. The resolution system may calculate a plurality of conditional probabilities for the plurality of resolution paths based on the ranked pretext identifiers and the conditional probabilities associated with each node. The resolution system may select a particular resolution path, from the plurality of resolution paths, associated with a greatest conditional probability of the plurality of conditional probabilities. The resolution system may determine the particular resolution path to be the resolution path for the unstructured interaction data based on the particular resolution path being associated with the greatest conditional probability of the plurality of conditional probabilities.

Figure 1F:
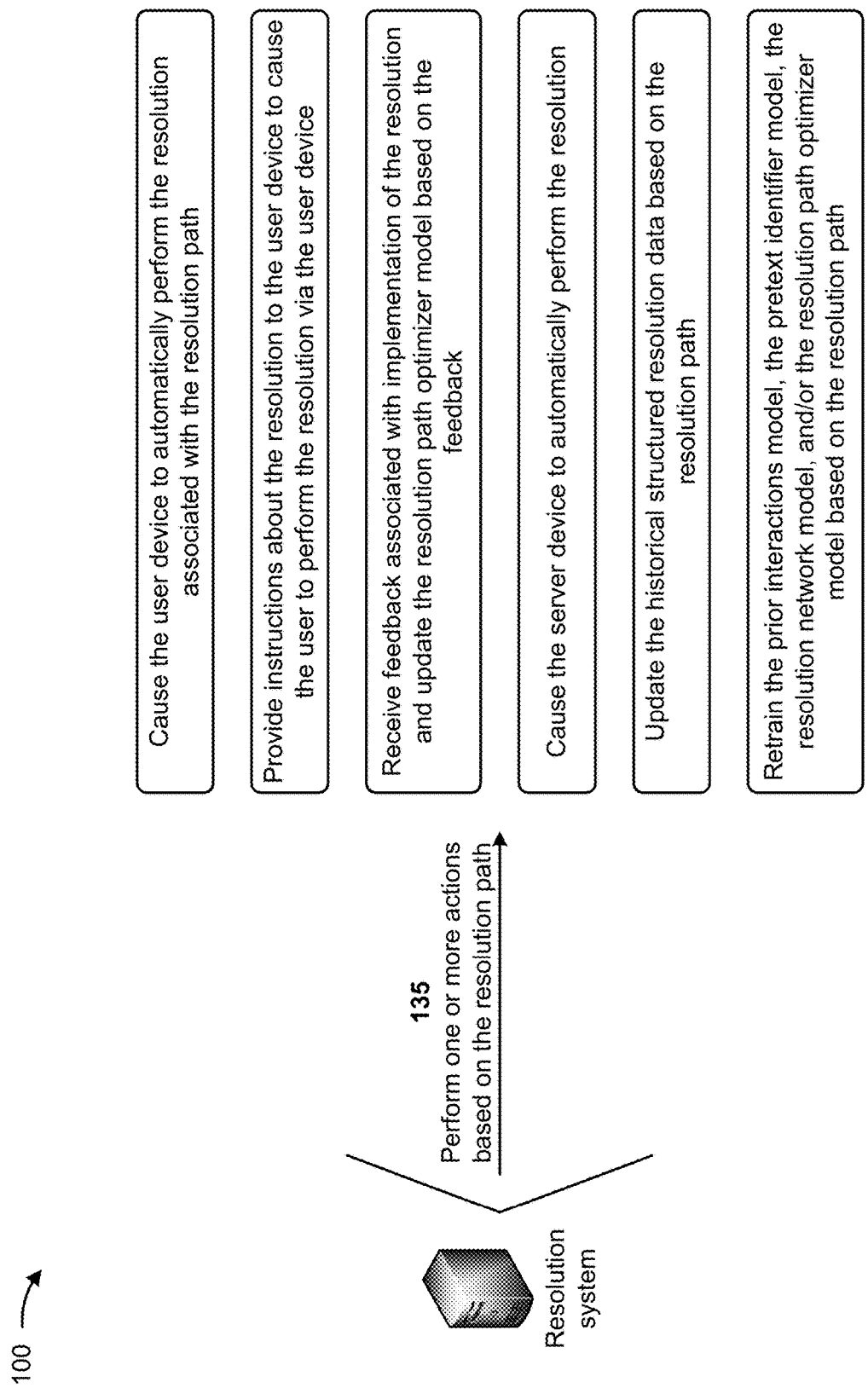

As shown in FIG. 1F, and by reference number 135, the resolution system may perform one or more actions based on the resolution path. In some implementations, the one or more actions include the resolution system causing the user device to automatically perform the resolution associated with the resolution path. For example, the resolution may include re-starting a particular process or application. The resolution system may transmit a command to the user device to cause the user device to automatically re-start the particular process or application.

In some implementations, the one or more actions include the resolution system providing the instructions about the resolution to the user device to cause the user to perform the resolution via the user device. The resolution system may provide a notification to the user device. The notification may include information identifying a set of actions to be performed by the user to reach the resolution. The user device may provide the notification to the user (e.g., via a display of the user device) to enable the user to perform the set of actions to reach the resolution.

In some implementations, the one or more actions include the resolution system receiving feedback associated with the implementation of the resolution and updating the resolution path optimizer model based on the feedback. The user may input feedback associated with the implementation of the resolution. The feedback may indicate a degree to which the resolution addressed an issue experienced by the user. The resolution system may update the resolution path optimizer model based on the degree to which the resolution addressed the issue experienced by the user.

In some implementations, the one or more actions include the resolution system causing the server device to automatically perform the resolution. For example, the resolution may include re-starting a particular process or application running on the server device. The resolution system may transmit a command to the server device to cause the server device to automatically re-start the particular process or application.

In some implementations, the one or more actions include the resolution system updating the historical structured resolution data based on the resolution path. The resolution system may generate structured resolution data based on the particular resolution determined for the unstructured interaction data. The resolution system may include the generated structured resolution data in the historical structured resolution data.

In some implementations, the one or more actions include the resolution system retraining the prior interactions model, the pretext identifier model, the resolution network model, and/or the resolution path optimizer model based on the resolution path. The resolution system may utilize the resolution path as additional training data for retraining the prior interactions model, the pretext identifier model, the resolution network model, and/or the resolution path optimizer model, thereby increasing the quantity of training data available for training the prior interactions model, the pretext identifier model, the resolution network model, and/or the resolution path optimizer model. Accordingly, the resolution system may conserve computing resources associated with identifying, obtaining, and/or generating historical data for training the prior interactions model, the pretext identifier model, the resolution network model, and/or the resolution path optimizer model relative to other systems for identifying, obtaining, and/or generating historical data for training machine learning models.

In this way, the resolution system utilizes machine learning models for determining an optimized resolution path for an interaction. The resolution system may utilize user-human agent unstructured interaction data to establish a motive behind an interaction and an underlying consequential pretext that caused the interaction. The resolution system may create a multi-nodal network representing different stages that resolved issues of the prior interactions, and may determine an optimized path to resolution from the multi-nodal network for issues raised through future interactions. This, in turn, conserves computing resources, networking resources, and/or the like that would otherwise have been wasted in processing a conversation flow that eventually is provided to a human agent, providing the conversation flow to the human agent, attempting to design unlimited conversation flows, and/or the like.

As indicated above, FIGS. 1A-1F are provided as an example. Other examples may differ from what is described with regard to FIGS. 1A-1F. The number and arrangement of devices shown in FIGS. 1A-1F are provided as an example.

In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
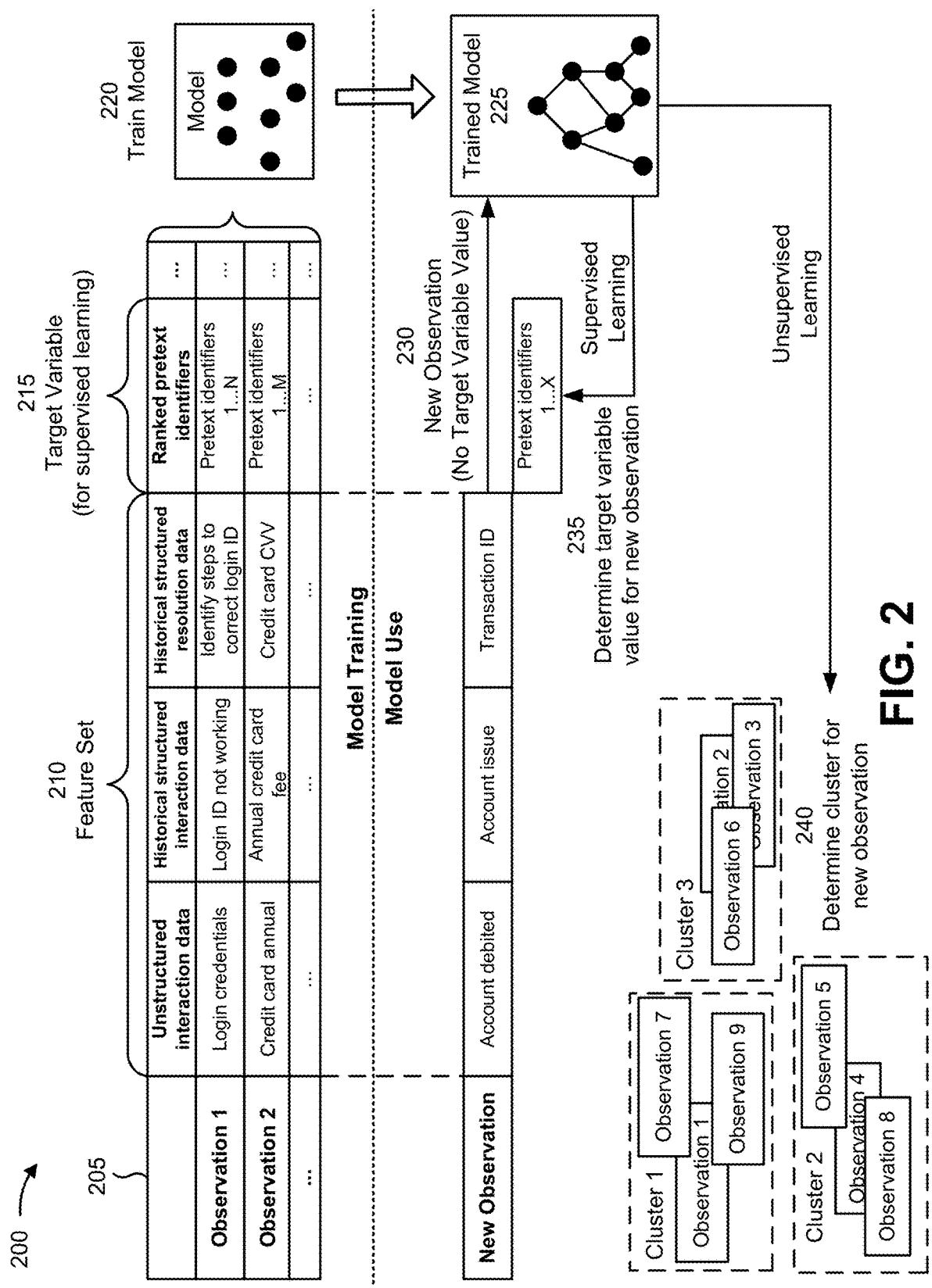
FIG. 2 is a diagram illustrating an example of training and using a machine learning model in connection with determining an optimized resolution path for an interaction.

FIG. 2 is a diagram illustrating an example 200 of training and using a machine learning model in connection with determining an optimized resolution path for an interaction. The machine learning model training and usage described herein may be performed using a machine learning system. The machine learning system may include or may be included in a computing device, a server, a cloud computing environment, and/or the like, such as the resolution system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the resolution system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the resolution system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of unstructured interaction data, a second feature of historical structured interaction data, a third feature of historical structured resolution data, and so on. As shown, for a first observation, the first feature may have a value of login credentials, the second feature may have a value of login ID not working, the third feature may have a value of identify steps to correct login ID, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is ranked pretext identifiers, which has a value of pretext identifiers 1 . . . N for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of a claim, a second feature of settle a claim, a third feature of customer service, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of pretext identifiers 1 . . . X for the target variable of ranked pretext identifiers for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an unstructured interaction data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., historical structured interaction data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine an optimized resolution path for an interaction. The machine learning system enables recognition and/or identification of tens, hundreds, thousands, or millions of features and/or feature values for tens, hundreds, thousands, or millions of observations, thereby increasing accuracy and consistency and reducing delay associated with determining an optimized resolution path for an interaction relative to requiring computing resources to be allocated for tens, hundreds, or thousands of operators to manually determine an optimized resolution path for an interaction.

As indicated above, FIG. 2 is provided as an example. Other examples may differ from what is described in connection with FIG. 2.

Figure 3:
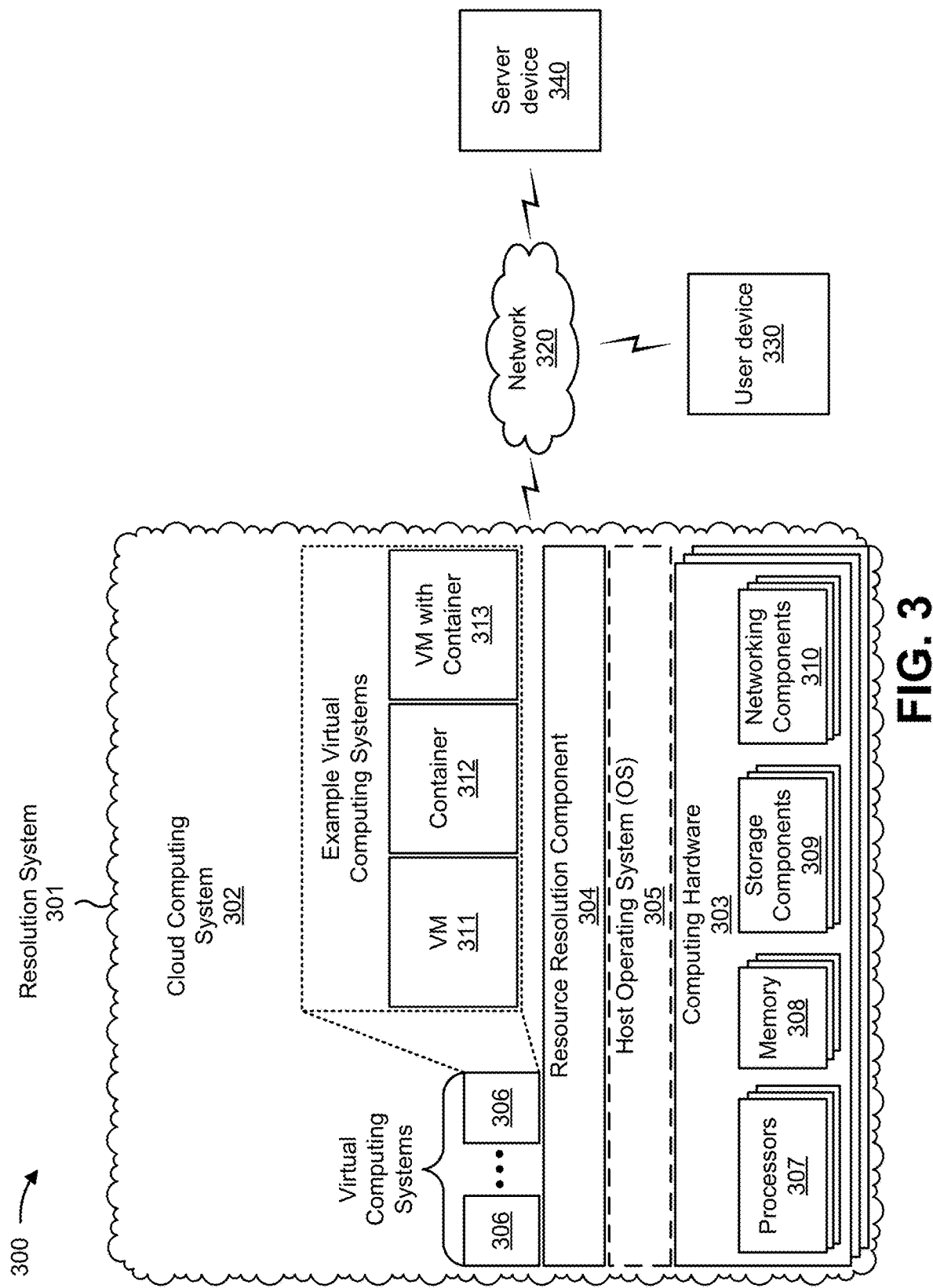
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a resolution system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the resolution system 301 may include one or more elements 303-313 of the cloud computing system 302, may execute within the cloud computing system 302, and/or may be hosted within the cloud computing system 302, in some implementations, the resolution system 301 may not be cloud-based (e.g., may be implemented outside of a cloud computing system) or may be partially cloud-based. For example, the resolution system 301 may include one or more devices that are not part of the cloud computing system 302, such as device 400 of FIG. 4, which may include a standalone server or another type of computing device. The resolution system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing unstructured interaction data identifying an interaction of a user with user device 330, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Server device 340 includes one or more devices capable of receiving, generating, storing, processing, providing, and/or routing information associated with receiving and/or determining historical unstructured interaction data identifying historical interactions of user and historical unstructured resolution data identifying historical resolutions to the historical interactions, as described elsewhere herein. Server device 340 may include a communication device and/or a computing device. For example, server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
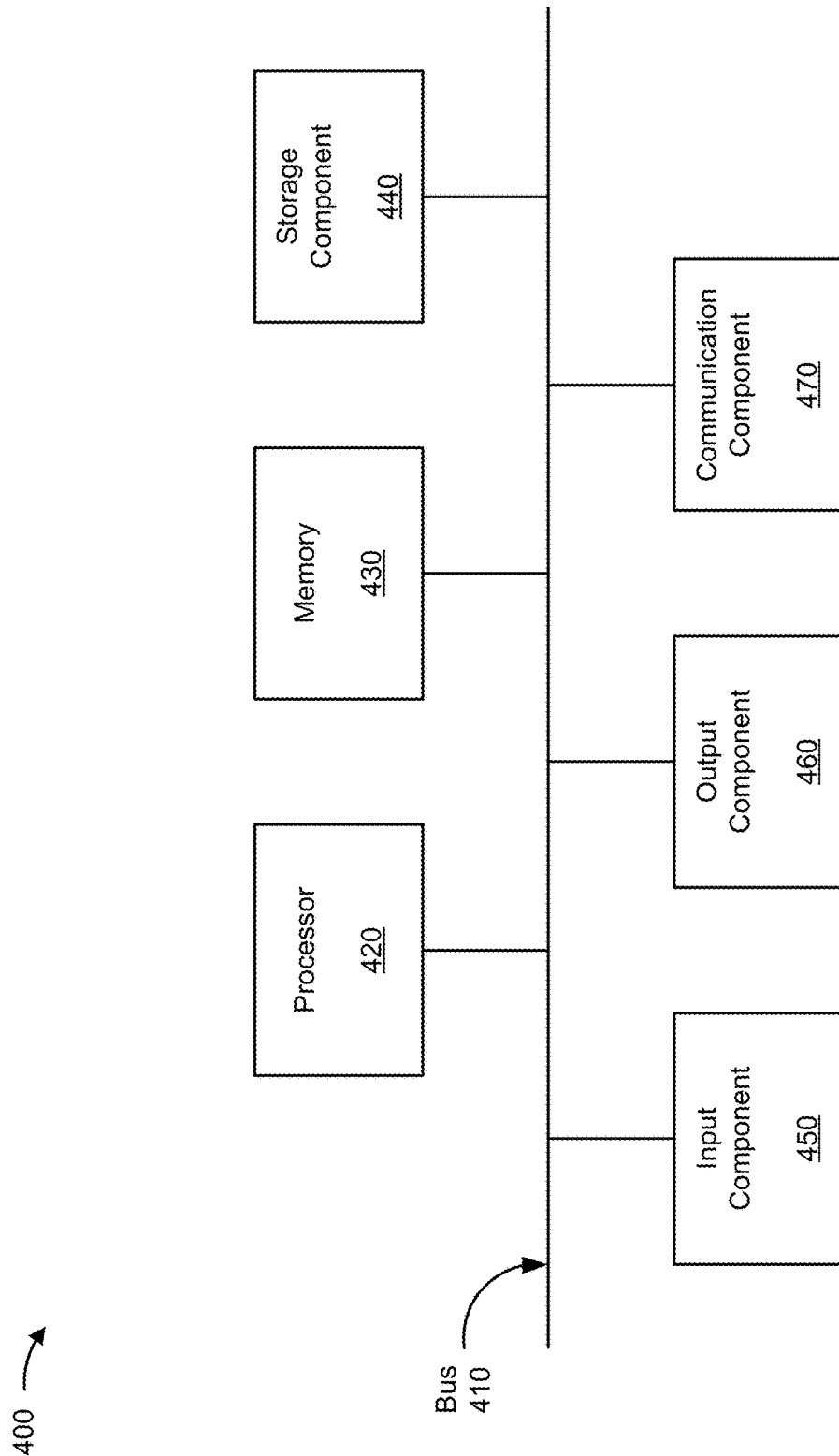
FIG. 4 is a diagram of example components of one or more devices of FIG. 3.

FIG. 4 is a diagram of example components of a device 400, which may correspond to resolution system 301, user device 330, and/or server device 340. In some implementations, resolution system 301, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
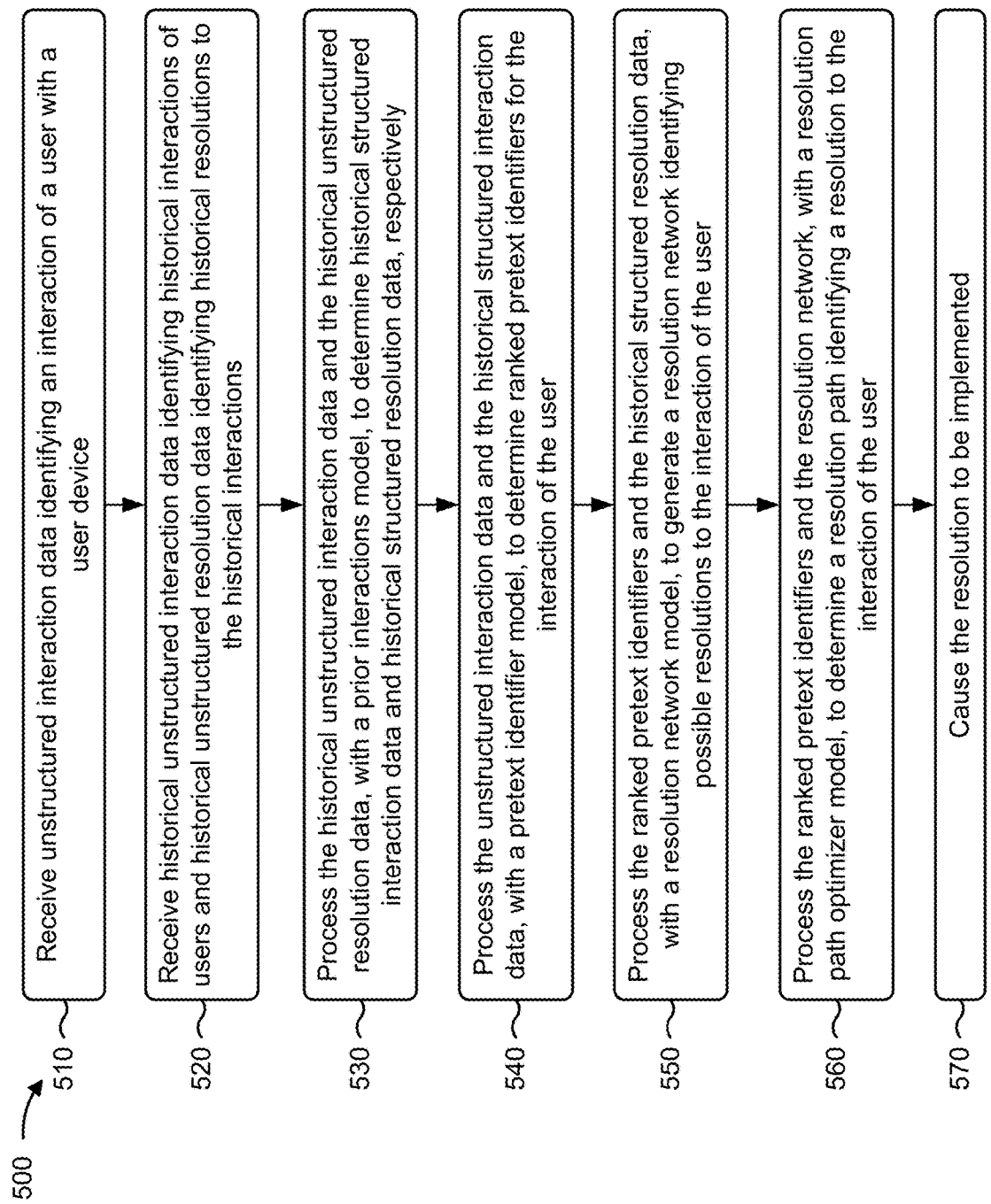
FIG. 5 is a flowchart of an example process for utilizing machine learning models for determining an optimized resolution path for an interaction.

FIG. 5 is a flowchart of an example process 500 that utilizes machine learning models for determining an optimized resolution path for an interaction. In some implementations, one or more process blocks of FIG. 5 may be performed by a device (e.g., resolution system 301). In some implementations, one or more process blocks of FIG. 5 may be performed by another device or a group of devices separate from or including the device, such as a server device (e.g., server device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving unstructured interaction data identifying an interaction of a user with a user device (block 510). For example, the device may receive unstructured interaction data identifying an interaction of a user with a user device, as described above. In some implementations, the device may include a conversational artificial intelligence system that includes a chatbot. The unstructured interaction data may include a textual query or a voice query provided by the user to the user device.

As further shown in FIG. 5, process 500 may include receiving historical unstructured interaction data identifying historical interactions of users and historical unstructured resolution data identifying historical resolutions to the historical interactions (block 520). For example, the device may receive historical unstructured interaction data identifying historical interactions of users and historical unstructured resolution data identifying historical resolutions to the historical interactions, as described above.

As further shown in FIG. 5, process 500 may include processing the historical unstructured interaction data and the historical unstructured resolution data, with a prior interactions model, to determine historical structured interaction data and historical structured resolution data, respectively (block 530). For example, the device may process the historical unstructured interaction data and the historical unstructured resolution data, with a prior interactions model, to determine historical structured interaction data and historical structured resolution data, respectively, as described above.

In some implementations, processing the historical unstructured interaction data and the historical unstructured resolution data, with the prior interactions model, to determine the historical structured interaction data and the historical structured resolution data may comprise converting audio data of the historical unstructured interaction data and the historical unstructured resolution data into text data, combining the text data, with textual data of the historical unstructured interaction data and the historical unstructured resolution data, to generate combined text data, and applying one or more rules to the combined text data to determine the historical structured interaction data and the historical structured resolution data. Alternatively, and/or additionally, processing the historical unstructured interaction data and the historical unstructured resolution data may comprise converting the historical unstructured interaction data and the historical unstructured resolution data into a format compatible with the pretext identifier model and the resolution network model, and to generate the historical structured interaction data and the historical structured resolution data.

As further shown in FIG. 5, process 500 may include processing the unstructured interaction data and the historical structured interaction data, with a pretext identifier model, to determine ranked pretext identifiers for the interaction of the user (block 540). For example, the device may process the unstructured interaction data and the historical structured interaction data, with a pretext identifier model, to determine ranked pretext identifiers for the interaction of the user, as described above. The pretext identifier model may include one or more of a random forest model, a linear regression model, a neural network model, or a classification model.

In some implementations, processing the unstructured interaction data and the historical structured interaction data, with the pretext identifier model, may comprise grouping the historical structured interaction data into a plurality of groups of the historical structured interaction data; comparing the unstructured interaction data with the plurality of groups of the historical structured interaction data to determine a plurality of similarity scores; and determining the ranked pretext identifiers based on the plurality of similarity scores.

As further shown in FIG. 5, process 500 may include processing the ranked pretext identifiers and the historical structured resolution data, with a resolution network model, to generate a resolution network identifying possible resolutions to the interaction of the user (block 550). For example, the device may process the ranked pretext identifiers and the historical structured resolution data, with a resolution network model, to generate a resolution network identifying possible resolutions to the interaction of the user, as described above. The resolution network model may include one or more of a network generator or a programmatic information interlinking graph model.

In some implementations, processing the ranked pretext identifiers and the historical structured resolution data may comprise extracting subjects and objects from the ranked pretext identifiers and the historical structured resolution data; generating nodes of the resolution network based on the subjects and the objects; and providing connectors between the nodes of the resolution network, based on actions between the subjects and the objects, and to generate the resolution network. Alternatively, and/or additionally, processing the ranked pretext identifiers and the historical structured resolution data may comprise generating resolution subnetworks based on semantic similarities between the ranked pretext identifiers and the historical structured resolution data; and aggregating the resolution subnetworks to generate the resolution network.

As further shown in FIG. 5, process 500 may include processing the ranked pretext identifiers and the resolution network, with a resolution path optimizer model, to determine a resolution path identifying a resolution to the interaction of the user (block 560). For example, the device may process the ranked pretext identifiers and the resolution network, with a resolution path optimizer model, to determine a resolution path identifying a resolution to the interaction of the user, as described above. The resolution path optimizer model may include one or more of an iterative probabilistic model, a posterior probability approach, or a stepwise node selection process.

In some implementations, processing the ranked pretext identifiers and the resolution network may comprise identifying a plurality of resolution paths through the resolution network; calculating a plurality of conditional probabilities for the plurality of resolution paths based on the ranked pretext identifiers; and selecting a particular resolution path, from the plurality of resolution paths, associated with a greatest conditional probability of the plurality of conditional probabilities. The particular resolution path corresponds to the resolution path.

As further shown in FIG. 5, process 500 may include causing the resolution to be implemented (block 570). For example, the device may cause the resolution to be implemented, as described above. In some implementations, the device may cause the user device to automatically perform the resolution associated with the resolution path, may provide instructions about the resolution to the user device to cause the user to perform the resolution via the user device, and/or may cause a server device to automatically perform the resolution.

In some implementations, the device may receive feedback associated with implementation of the resolution and may update the resolution path optimizer model based on the feedback. In some implementations, the device may update the historical structured resolution data based on the resolution path and/or may retrain one or more of the prior interactions model, the pretext identifier model, the resolution network model, or the resolution path optimizer model based on the resolution path.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, unstructured interaction data identifying an interaction of a user with a user device;
    receiving, by the device, historical unstructured interaction data identifying historical interactions of users and historical unstructured resolution data identifying historical resolutions to the historical interactions;
    processing, by the device, the historical unstructured interaction data and the historical unstructured resolution data, with a prior interactions model, to determine historical structured interaction data and historical structured resolution data, respectively;
    processing, by the device, the unstructured interaction data and the historical structured interaction data, with a pretext identifier model, to determine ranked pretext identifiers for the interaction of the user;
    processing, by the device, the ranked pretext identifiers and the historical structured resolution data, with a resolution network model, to generate a resolution network identifying possible resolutions to the interaction of the user;
    processing, by the device, the ranked pretext identifiers and the resolution network, with a resolution path optimizer model, to determine a resolution path identifying a resolution to the interaction of the user; and
    causing, by the device, the resolution to be implemented.

2. The method of claim 1, further comprising one or more of:
    causing the user device to automatically perform the resolution associated with the resolution path;
    providing instructions about the resolution to the user device to cause the user to perform the resolution via the user device; or
    causing a server device to automatically perform the resolution.

3. The method of claim 1, further comprising:
    receiving feedback associated with implementation of the resolution; and
    updating the resolution path optimizer model based on the feedback.

4. The method of claim 1, further comprising one or more of:
    updating the historical structured resolution data based on the resolution path; or
    retraining one or more of the prior interactions model, the pretext identifier model, the resolution network model, or the resolution path optimizer model based on the resolution path.

5. The method of claim 1, wherein each of the pretext identifier model, the resolution network model, and the resolution path optimizer model includes one or more of:
    a random forest model,
    a linear regression model,
    a neural network model,
    a classification model,
    an iterative probabilistic model,
    a posterior probability approach,
    a stepwise node selection process,
    a network generator, or
    a programmatic information interlinking graph model.

6. The method of claim 1, wherein the device includes a conversational artificial intelligence system that includes a chatbot.

7. The method of claim 1, wherein processing the historical unstructured interaction data and the historical unstructured resolution data, with the prior interactions model, to determine the historical structured interaction data and the historical structured resolution data comprises:
    converting audio data of the historical unstructured interaction data and the historical unstructured resolution data into text data;
    combining the text data, with textual data of the historical unstructured interaction data and the historical unstructured resolution data, to generate combined text data; and
    applying one or more rules to the combined text data to determine the historical structured interaction data and the historical structured resolution data.

8. A device, comprising:
    one or more memories; and
    one or more processors, communicatively coupled to the one or more memories, configured to:
        receive unstructured interaction data identifying an interaction of a user with a user device;

receive historical unstructured interaction data identifying historical interactions of users and historical unstructured resolution data identifying historical resolutions to the historical interactions;

process the historical unstructured interaction data and the historical unstructured resolution data, with a prior interactions model, to determine historical structured interaction data and historical structured resolution data, respectively;

process the unstructured interaction data and the historical structured interaction data, with a pretext identifier model, to determine ranked pretext identifiers for the interaction of the user;

process the ranked pretext identifiers and the historical structured resolution data, with a resolution network model, to determine a resolution network identifying possible resolutions to the interaction of the user;

process the ranked pretext identifiers and the resolution network, with a resolution path optimizer model, to determine a resolution path identifying a resolution to the interaction of the user; and perform one or more actions based on the resolution path.

9. The device of claim 8, wherein the one or more processors, when processing the historical unstructured interaction data and the historical unstructured resolution data, with the prior interactions model, to determine the historical structured interaction data and the historical structured resolution data, are configured to:

convert the historical unstructured interaction data and the historical unstructured resolution data into a format compatible with the pretext identifier model and the resolution network model, and to generate the historical structured interaction data and the historical structured resolution data.

10. The device of claim 8, wherein the one or more processors, when processing the unstructured interaction data and the historical structured interaction data, with the pretext identifier model, to determine the ranked pretext identifiers, are configured to:

group the historical structured interaction data into a plurality of groups of the historical structured interaction data;

compare the unstructured interaction data with the plurality of groups of the historical structured interaction data to determine a plurality of similarity scores; and determine the ranked pretext identifiers based on the plurality of similarity scores.

11. The device of claim 8, wherein the one or more processors, when processing the ranked pretext identifiers and the historical structured resolution data, with the resolution network model, to generate the resolution network, are configured to:

extract subjects and objects from the ranked pretext identifiers and the historical structured resolution data;

generate nodes of the resolution network based on the subjects and the objects; and provide connectors between the nodes of the resolution network, based on actions between the subjects and the objects, and to generate the resolution network.

12. The device of claim 8, wherein the one or more processors, when processing the ranked pretext identifiers and the historical structured resolution data, with the resolution network model, to generate the resolution network, are configured to:

generate resolution subnetworks based on semantic similarities between the ranked pretext identifiers and the historical structured resolution data; and aggregate the resolution subnetworks to generate the resolution network.

13. The device of claim 8, wherein the one or more processors, when processing the ranked pretext identifiers and the resolution network, with the resolution path optimizer model, to determine the resolution path, are configured to:

identify a plurality of resolution paths through the resolution network;

calculate a plurality of conditional probabilities for the plurality of resolution paths based on the ranked pretext identifiers; and select a particular resolution path, from the plurality of resolution paths, associated with a greatest conditional probability of the plurality of conditional probabilities, wherein the particular resolution path corresponds to the resolution path.

14. The device of claim 8, wherein the unstructured interaction data includes a textual query or a voice query provided by the user to the user device.

15. A non-transitory computer-readable medium storing a set of instructions, the set of instructions comprising:

one or more instructions that, when executed by one or more processors of a device, cause the device to:

receive interaction data identifying an interaction of a user with a user device;

receive historical interaction data identifying historical interactions of users and historical resolution data identifying historical resolutions to the historical interactions;

process the interaction data and the historical interaction data, with a pretext identifier model, to determine ranked pretext identifiers for the interaction of the user;

process the ranked pretext identifiers and the historical resolution data, with a resolution network model, to generate a resolution network identifying possible resolutions to the interaction of the user;

process the ranked pretext identifiers and the resolution network, with a resolution path optimizer model, to determine a resolution path identifying a resolution to the interaction of the user; and cause the resolution to be implemented.

16. The non-transitory computer-readable medium of claim 15, wherein the one or more instructions further cause the device to one or more of:

cause the user device to automatically perform the resolution associated with the resolution path;

provide instructions about the resolution to the user device to cause the user to perform the resolution via the user device;

cause a server device to automatically perform the resolution;

receive feedback associated with implementation of the resolution, and update the resolution path optimizer model based on the feedback;

update the historical resolution data based on the resolution path; or retrain one or more of the pretext identifier model, the resolution network model, or the resolution path optimizer model based on the resolution path.

17. The non-transitory computer-readable medium of claim 15, wherein the one or more instructions, that cause the device to process the interaction data and the historical interaction data, with the pretext identifier model, to determine the ranked pretext identifiers, cause the device to:
- group the historical interaction data into a plurality of groups of the historical interaction data;
- compare the interaction data with the plurality of groups of the historical interaction data to determine a plurality of similarity scores; and
- determine the ranked pretext identifiers based on the plurality of similarity scores.

18. The non-transitory computer-readable medium of claim 15, wherein the one or more instructions, that cause the device to process the ranked pretext identifiers and the historical resolution data, with the resolution network model, to generate the resolution network, cause the device to:
- extract subjects and objects from the ranked pretext identifiers and the historical resolution data;
- generate nodes of the resolution network based on the subjects and the objects; and
- provide connectors between the nodes of the resolution network, based on actions between the subjects and the objects, and to generate the resolution network.

19. The non-transitory computer-readable medium of claim 15, wherein the one or more instructions, that cause the device to process the ranked pretext identifiers and the historical resolution data, with the resolution network model, to generate the resolution network, cause the device to:
- generate resolution subnetworks based on semantic similarities between the ranked pretext identifiers and the historical resolution data; and
- aggregate the resolution subnetworks to generate the resolution network.

20. The non-transitory computer-readable medium of claim 15, wherein the one or more instructions, that cause the device to process the ranked pretext identifiers and the resolution network, with the resolution path optimizer model, to determine the resolution path, cause the device to:
- identify a plurality of resolution paths through the resolution network;
- calculate a plurality of conditional probabilities for the plurality of resolution paths based on the ranked pretext identifiers; and
- select a particular resolution path, from the plurality of resolution paths, associated with a greatest conditional probability of the plurality of conditional probabilities, wherein the particular resolution path corresponds to the resolution path.

* * * * *